United States Patent [19]
Wang

[11] Patent Number: 5,615,753
[45] Date of Patent: Apr. 1, 1997

[54] BRAKE ASSEMBLY FOR A BICYCLE

[76] Inventor: Jenny C. H. Wang, No. 23, 21th Rd., Taichung Industrial Park, Taichung City, Taiwan

[21] Appl. No.: 584,683

[22] Filed: Jan. 11, 1996

[51] Int. Cl.⁶ ............................................. B60T 11/00
[52] U.S. Cl. ........................... 188/24.12; 188/24.16; 188/344; 92/187; 74/489
[58] Field of Search .................... 188/24.11, 24.12, 188/24.14, 24.15, 24.16, 24.19, 24.21, 24.22, 344; 92/187; 74/489

[56]  References Cited

U.S. PATENT DOCUMENTS

| | | | |
|---|---|---|---|
| 3,802,323 | 4/1974 | Suechting | 92/187 X |
| 3,870,127 | 3/1975 | Wilson et al. | 188/24.15 |
| 3,935,930 | 2/1976 | Kline | 188/344 |
| 4,560,049 | 12/1985 | Uchibaba et al. | 188/344 X |
| 4,585,094 | 4/1986 | Rottenkolber et al. | 188/24.22 |
| 4,921,081 | 5/1990 | Chilcote | 188/344 |

*Primary Examiner*—Lee W. Young
*Attorney, Agent, or Firm*—Morton J. Rosenberg; David I. Klein

[57]  ABSTRACT

A brake assembly for a bicycle includes a brake lever which is pivotally engaged to a base in which a first chamber is defined, the first chamber being filled with oil and a first piston movably received therein which is actuated by the brake lever, a wheel of the bicycle having a first arm disposed on one side thereof and a second arm disposed on the other side of the wheel, each of the first and the second arms having a second chamber defined therein, a second piston movably received in the second chamber and connected to a brake pad on a distal end thereof, a first pipe connected between said first chamber and the second chamber of the first arm and a second pipe connected between the respective second chamber of the first and the second arms.

4 Claims, 5 Drawing Sheets

BRAKE ASSEMBLY FOR A BICYCLE

BACKGROUND OF THE INVENTION

The present invention relates to a brake assembly for a bicycle and more particularly, to a brake assembly using a hydraulic system to move brake pads to stop the bicycle.

A conventional bicycle equipped with a hand operated brake system which includes a pair of brake arms pivotally disposed on a bicycle front fork or a rear seat stay and mounted one both sides of a wheel. Each of the brake arms has one end with a brake pad securely disposed thereto and a brake cable connected to the other end of the brake arm, the brake cable is connected to a brake lever mounted on respective one of two handlebars of the bicycle. When a rider operates the brake levers, the brake arms are pivoted about an axis of the pivoted point thereof by the pulling force from the corresponding brake cable thereof so as to move the brake pad to contact a rim of the wheel to stop the bicycle.

However, frequently, the spacing of the two brake pads from the wheel rim becomes unequal and this results in bending of the bicycle frame, uneven wear one the brake pads or unequal tension one the bicycle wheel spokes. When the two brake pads are spaced unequally from the sides of the wheel, they will apply unequal force as the bicycle brake are applied. This detracts markedly from braking efficiency, since the frictional force applied in one lateral direction is greater than that applied in the opposite direction, this could results in unequal wear on the brake pads and can force the bicycle wheel into a condition of misalignment. Furthermore, the brake cords could be broken off because of material problems or a sudden force being applied thereto, this is dangerous.

The present invention intends to provide a brake assembly to provide an equal and steady force to each one of the two brake pads one both sides of the wheel thus can mitigate and/or obviate the above-mentioned problems.

SUMMARY OF THE INVENTION

The present invention provides a brake assembly for a bicycle and which includes a brake lever which is pivotally engaged to a base in which a first chamber is defined, the first chamber being filled with oil and a first piston movably received therein which is actuated by the brake lever. A bicycle wheel has a first arm disposed on one side thereof and a second arm disposed on the other side thereof, each of the first and the second arms having a second chamber defined therein, a second piston movably received in the second chamber and connected to a brake pad on a distal end thereof. A first pipe is connected between said first chamber and said second chamber of said first arm and a second pipe connected between said respective second chamber of said first and said second arms.

It is an object of the present invention to provide a brake assembly actuated by hydraulic force which is provided by grasping brake levers.

It is another object of the present invention to provide a sufficient and steady force to actuate the brake assembly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
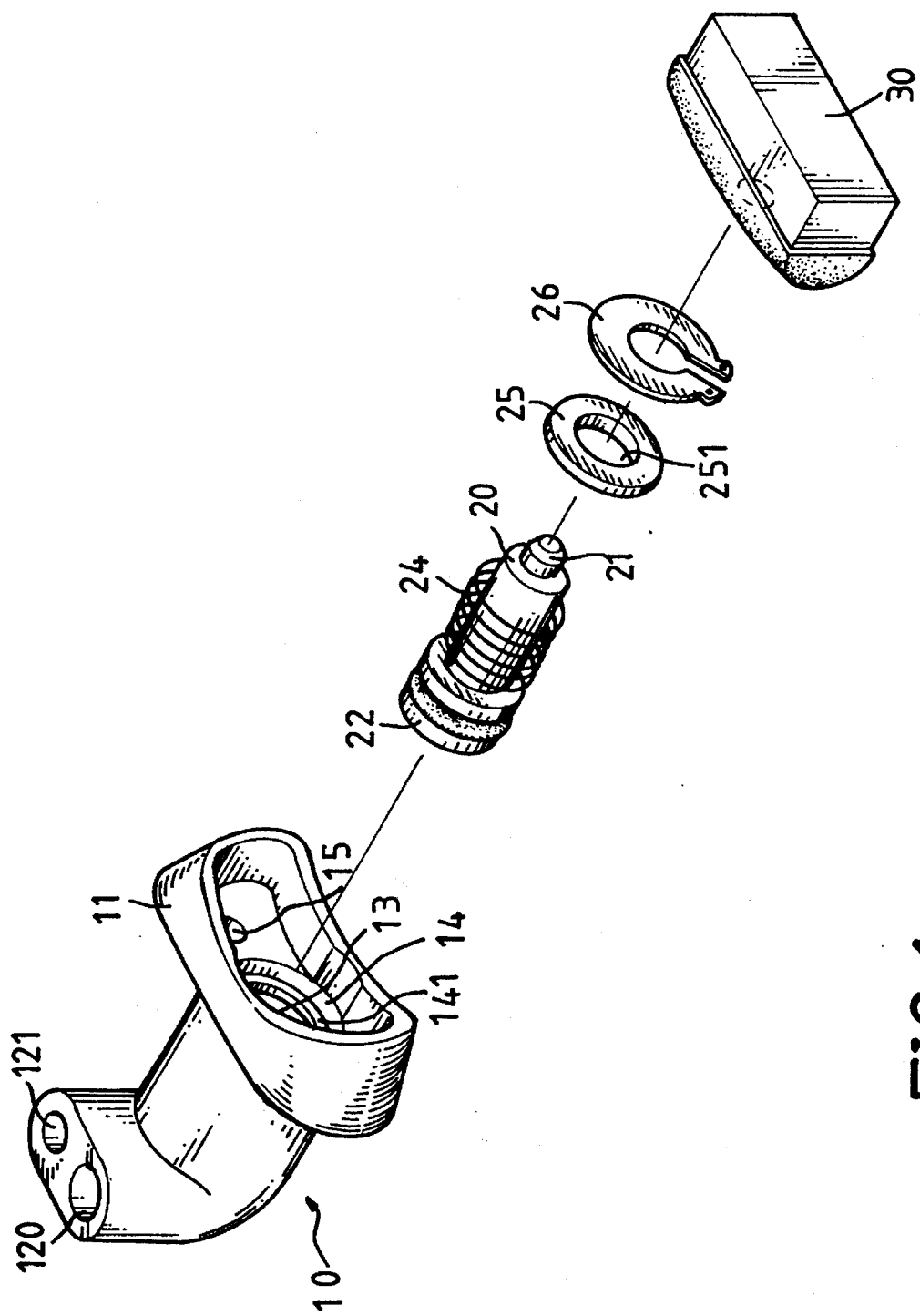
FIG. 1 is a perspective view of an brake arm in accordance with the present invention.
Figure 2:
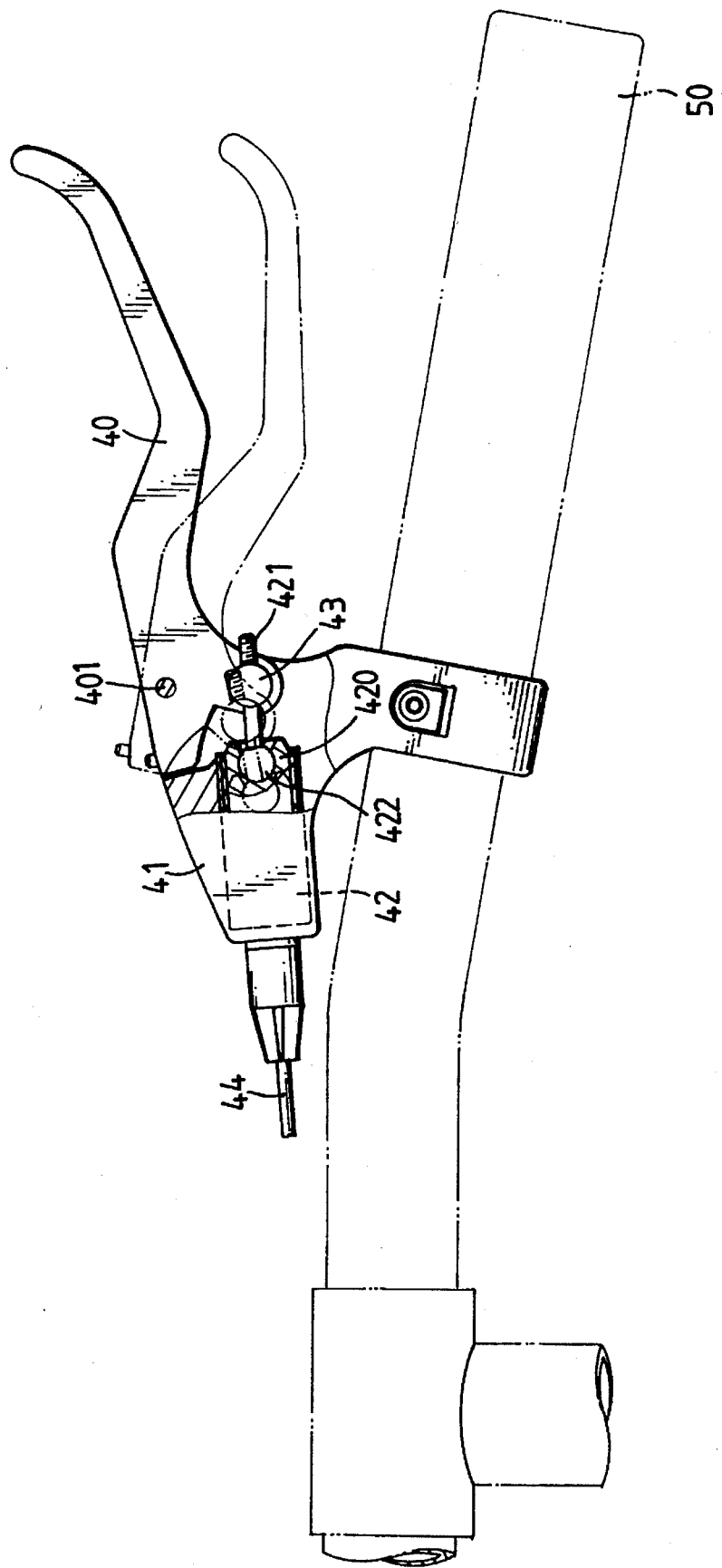
FIG. 2 is a side elevational view, partly in section, of a brake lever in accordance with the present invention.
Figure 3:
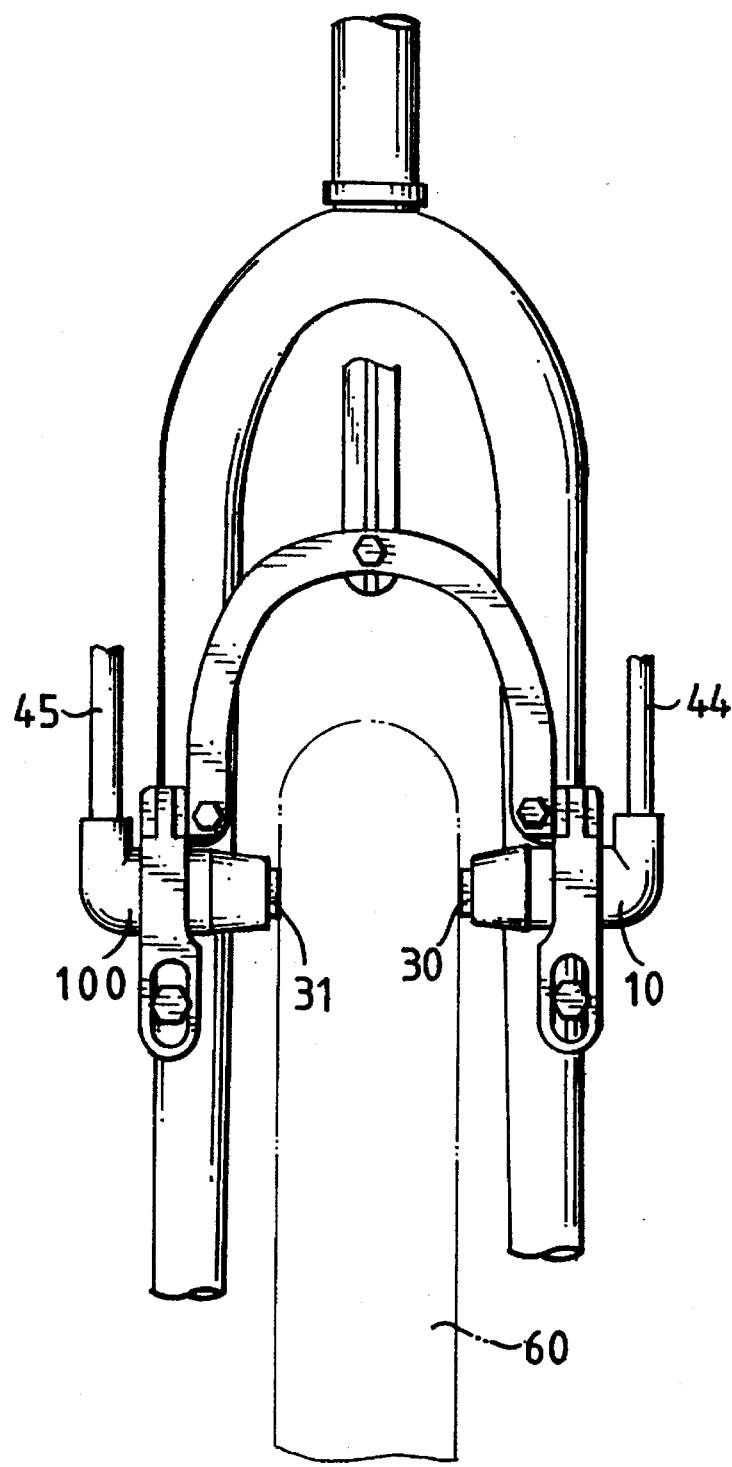
FIG. 3 is an illustrative view to show the brake arms disposed to both sides of a bicycle wheel.

Referring to the drawings and initially to FIGS. 1 through 3, a brake assembly for a bicycle in accordance with the present invention generally includes a base 41 (FIG. 2) mounted to a handlebar 50 of the bicycle and having a first chamber 42 defined in the base 41 for oil (not shown) filled in the first chamber 42. A first piston 420 movably received in the first chamber 42 and a connecting rod 421 extending through the first piston 420, the connecting rod 421 having a first end and a second end, the first end thereof engaged to a ball 422 which is rotatably received in a recess defined in the first piston 420. A brake lever 40 has a first end pivotally engaged to the base 41 at a first point of the brake lever 40 by a first pin 401, the first point located on a line vertical to the longitudinal axis of the connecting rod 421. A second pin 43 extends transversely through the first end of the brake lever 40 and the connecting rod 421 engaged to the second pin 43 at a second point located on an axis of the first chamber 42 such that when a second end of the brake lever 40 is grasped, the brake lever 40 rotates about an axis of the first pin 401 thus to push the connecting rod 421 to move with the first piston 420 to push the oil in the first chamber 42 flew from a firs pipe 44 which is connected to the base 41 and communicates with the first chamber 42.

A first arm 10 is disposed on a bicycle frame and located one side of a wheel 60 of the bicycle, a second arm 100 is disposed on the bicycle frame and located on the other side of the wheel 60, the first arm 10 having a first end and a second end, the first end thereof having a first hole 120 and a second hole 121 defined therein, the second end thereof having a second chamber 13 defined therein and the second chamber 13 communicating with the first and the second holes 120, 121. A second piston 20 is movably received in the second chamber 13 and a spring 24 is mounted to the second piston 20, the second piston 20 having a first end with a head 22 and a second end having a protrusion 21 extending longitudinally therefrom such that the protrusion 21 is securely engaged to a first brake pad 30. The second arm 100 has the same structure as that of the first arm 10 except that a first end of the second arm 100 has only one hole defined therein. Each of the first and the second arms 10, 100 has a first groove 14 and a second groove 141 respectively defined in an inner peripheral surface thereof, an end plate 25 securely received in the second groove 141 and the end plate 25 having a central hole 251 defined therein for the second piston 20 extending therethrough, a C-shaped clamp 26 being received in the first groove 14. The second end of each one of the first and the second arms 10, 100 has a receiving portion 11 extending therefrom and communicating with the second chamber 13 so as to receive the brake pad 30 therein. The receiving portion 11 is a box-like element and at least one side wall of the receiving portion 11 has a hole 15 defined therein such that when said brake pad 30 is pulled to received in the receiving portion 11, an air pressure in the receiving portion 11 can be released from the hole 15.

Figure 4:
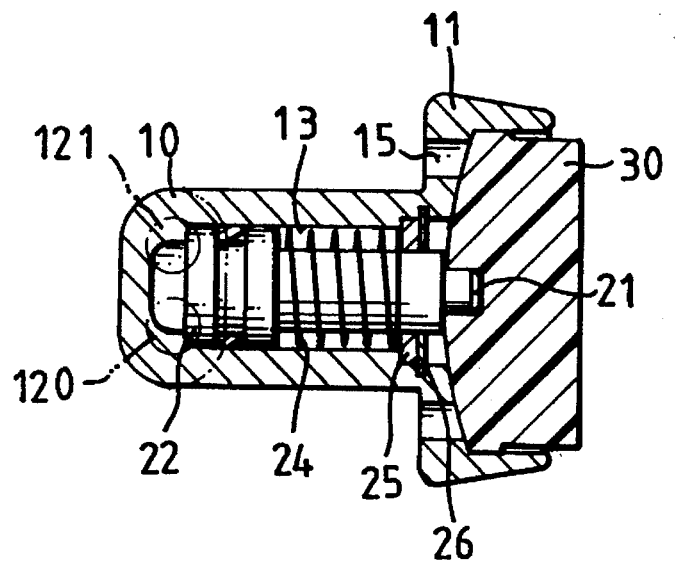
FIG. 4 is a side elevational view, partly in section, of the brake arm in accordance with the present invention.
Figure 5:
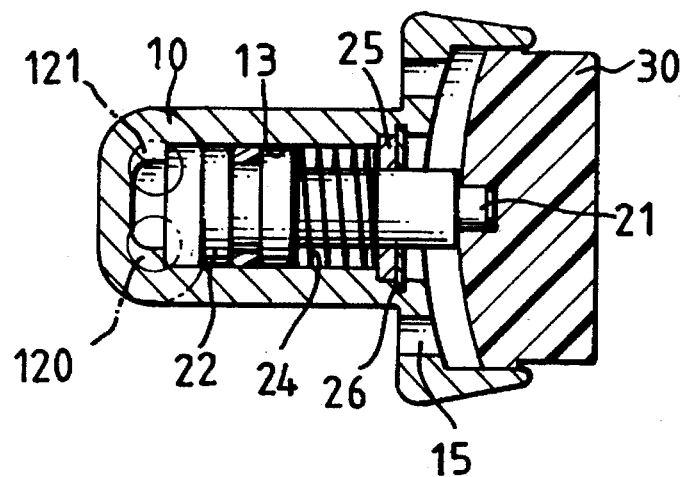
FIG. 5 is a side elevational view, partly in section, of a brake lever wherein a brake pad is pulled from the brake arm.
Figure 6:
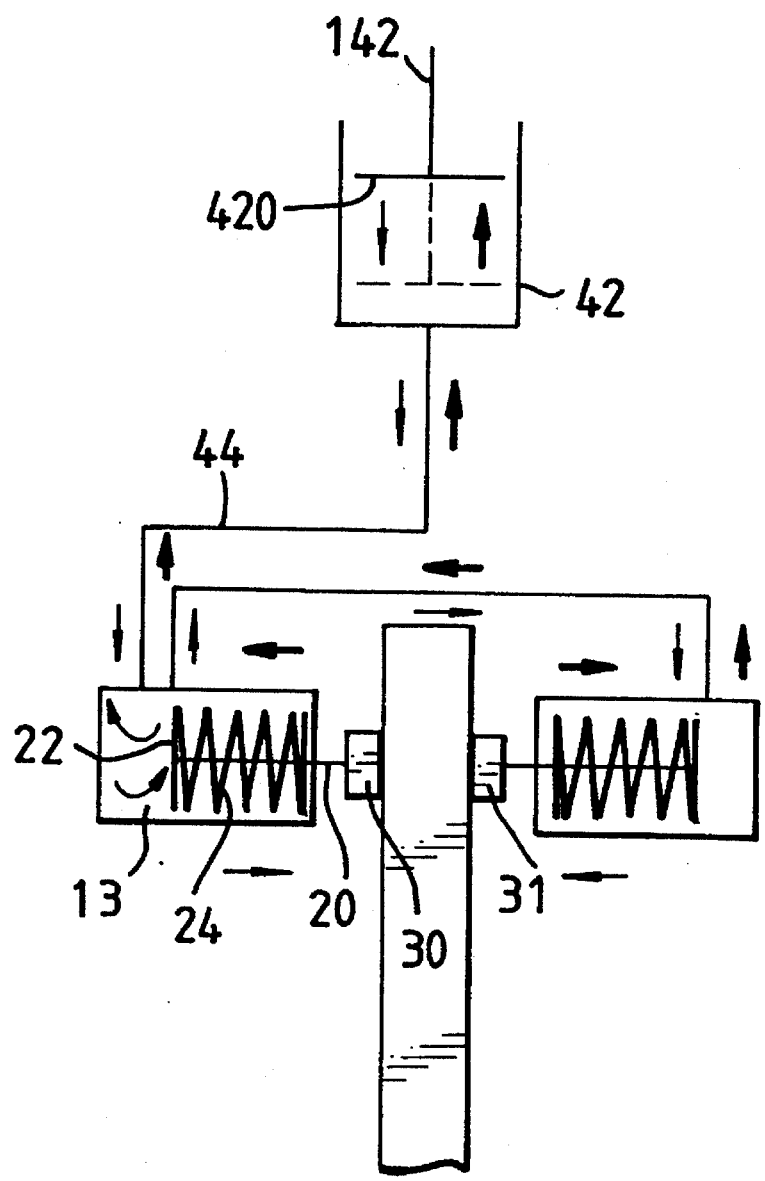
FIG. 6 is a simplified drawing to show an embodiment of a hydraulic system in accordance with the present invention.

Further referencing to FIGS. 4 to 6, the first pipe 44 connects between the first chamber 42 and the first hole 120 of the first arm 10, a second pipe 45 (FIG. 3) extending from the second hole 121 of the first arm 10 and connected to the hole of the first end of the second arm 100. When the brake lever 40 is grasped, the oil in the first chamber 42 is forced to flow into the second chamber 13 of the first arm 10 via the first pipe 44 and the first hole 120 so as to push the second piston 20 and the brake pad 30 toward the wheel 60, in the same time, oil also flows to the second chamber in the second arm 100 via the second pipe 45 to push the corresponding brake pad 31 (FIG. 6) toward the wheel 60 to stop the wheel 60. When the braking action is completed, the oil flows back to the first chamber 42 by a biasing force of the spring 24.

Accordingly, the braking force is provided by a hydraulic system described above, i.e. the braking force is sufficient and steady and has on risk of brake cables broken off happened in the conventional brake assembly.

Although the invention has been explained in relation to its preferred embodiment, it is to be understood that many other possible modifications and variations can be made without departing from the spirit and scope of the invention as hereinafter claimed.

I claim:

1. A brake assembly for a bicycle and comprising:

a base adapted to be mounted to a handlebar of said bicycle and having a first chamber defined in said base and oil filling said first chamber, a first piston movably received in said first chamber and a connecting rod connected to said first piston, said connecting rod having a first end and a second end, said first end thereof engaged to a ball which is rotatably received in a recess defined in said first piston;

a brake lever having a first end pivotally engaged to said base at a first point of said brake lever, said first point located on a line vertical to a longitudinal axis of said connecting rod, a pin extending through said first end of said brake lever and said connecting rod engaged to said pin at a second point located on an axis of said first chamber such that when a second end of said brake lever is grasped, said brake lever is rotated about an axis of said first point and said connecting rod is pushed to move with said first piston to push the oil in said first chamber;

a first arm and a second arm respectively mountable on a frame of said bicycle, said first arm being mountable on one side of a wheel of said bicycle, said second arm mountable on the other side of said wheel, said first arm having a first end and a second end, said first end thereof having a first hole and a second hole defined therein, said second end thereof having a second chamber defined therein and said second chamber communicating with said first and said second holes, a second piston movably received in said second chamber and a spring mounted to said second piston which has a protrusion extending longitudinally therefrom and said protrusion securely engaged to a first brake pad, said second arm having a first end and a second end, said first end thereof having only a first hole defined therein, said second end thereof having a second chamber defined therein and said second chamber thereof communicating with said first hole thereof, a second piston movably received in said second chamber thereof and a spring mounted to said second piston thereof which has a protrusion securely engaged to a second brake pad, and a first pipe extending from said base, one end of said first pipe communicating with said first chamber, the other end of said first pipe communicating with said first hole of said first arm, a second pipe extending from said second hole of said first arm and connected to said hole of said first end of said second arm.

2. The brake assembly as claimed in claim 1 wherein each of said first and said second arms has a groove defined in an inner peripheral surface thereof, an end plate securely received in said groove and said end plate having a central hole defined therein for said second piston protrusion to extend therethrough.

3. The brake assembly as claimed in claim 1 wherein said second end of each one of said first and said second arms has a receiving portion extending from said second end thereof so as to receive said brake pad therein.

4. The brake assembly as claimed in claim 3 wherein said receiving portion is a box shaped element and at least one side wall of said receiving portion has a hole defined therein.

* * * * *